Patented May 14, 1935

2,001,044

UNITED STATES PATENT OFFICE 2,001,044

NITROGEN CONTAINING ANTHRAQUINONE DERIVATIVES

Klaus Weinand, Leverkusen-I. G. Werk, Curt Bamberger, Cologne-Mulheim, and Hermann Utsch, Leverkusen-Wiesdorf, Germany, assignors to General Aniline Works, Inc., New York, N. Y., a corporation of Delaware No Drawing. Application January 22, 1934, Serial No. 707,848. In Germany February 1, 1933

13 Claims. (Cl. 260—60)

The present invention relates to new nitrogen containing anthraquinone derivatives and to a process of preparing the same.

We have found that new anthraquinone derivatives are obtained by causing amines which contain at least one hydrogen atom attached to the nitrogen of the amine to react upon compounds of the following formula:—

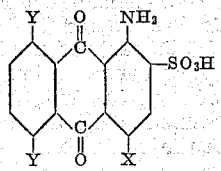

wherein X stands for chlorine or bromine and one Y stands for an acylamino group, the other Y indicating hydrogen.

The reaction is performed in the manner usually applied for substituting the 4-halogen atom of an anthraquinone derivative by an amino group, for instance, in the presence of an alkaline reacting agent, such as sodium carbonate and in the presence of a copper salt.

As amines representing one of the reaction components there can be used, for instance, ammonia, primary or secondary aliphatic or hydroaromatic or aromatic amines, mixed aliphatic-hydroaromatic amines, mixed aliphatic-aromatic amines, aromatic diamines, mono- and diamines of the biphenyl series, sulfamino compounds, etc. It is to be understood that the aromatic or hydroaromatic nuclei may contain various substituents, such as alkoxy-, alkyl-, acyl-amino groups and so on.

The anthraquinone derivatives serving as starting materials in the present reaction can be prepared in a known manner, for instance, by acylating 1.5- or 1.8-diaminoanthraquinone-2-sulfonic acid and halogenating the acylamino-aminoanthraquinone sulfonic acids thus obtained. As acyl groups there can be used, for example, acetyl, propionyl, alkoxy-acetyl, benzoyl or naphthoyl groups.

The new dyestuffs correspond to the following formula:—

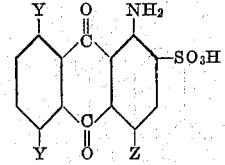

wherein Z stands for an amino group, which may contain aliphatic, hydroaromatic, or aromatic radicals and one Y stands for an acylamino group.

The new dyestuffs are easily soluble in water and dye wool from an acid bath bluish to green shades.

In case such amines are used, which upon condensation with 1.amino-4-halogenanthraquinone-2-sulfonic acids yield dyestuffs which are capable of dyeing vegetable fibres, this quality is maintained if the dyestuffs contain an acylamino group in the 5- or 8-position according to our present invention.

The colors of the new dyestuffs thus obtained are in most cases somewhat more greenish than those of the corresponding dyestuffs, which do not contain the acylamino group.

The following examples illustrate the invention, without, however, restricting it thereto, the parts being by weight:—

Example 1

10 parts of 1-amino-5-acetylamino-4-bromo-anthraquinone-2-sulfonic acid in form of the sodium salt, 5 parts of sodium carbonate, 0.5 part of copper sulfate are dissolved in 100 parts of a 5% ammonia solution at a temperature of 70–80° C. The mixture is stirred, until a dark blue solution is obtained. By salting out by means of sodium chloride there is obtained the 1,4-diamino-5-acetylamino-2-sulfonic acid in form of crystalline needles. The new dyestuff dyes wool from an acid bath blue shades.

If the aqueous solution of ammonia is replaced by an aqueous solution of an equimolecular amount of methylamine, there is obtained the 1-amino-4-methylamino-5-acetylamino-2-sulfonic acid of similar properties. This dyestuff dyes wool from an acid bath blue shades of a somewhat more greenish tint than the above mentioned dyestuff.

Example 2

9 parts of 1-amino-5-acetylamino-4-bromo-anthraquinone-2-sulfonic acid in form of its sodium salt or 9 parts of the sodium salt of 1-amino-5-methoxyacetylamino-4-bromoanthraquinone-2-sulfonic acid, 30 parts of hexahydroaniline, 3 parts of sodium carbonate and 0.3 part of copper sulfate are added to 300 parts of of water and 200 parts of ethylalcohol. The solution is kept boiling for about 2 hours while stirring. Upon distilling off of the hexahydroaniline and the ethyl alcohol, the dyestuff is salted out by the addition of sodium chloride. The new dyestuff is obtained in form of fine blue crystals, which are easily soluble in water and dye wool from an acid bath clear blue shades of a good fastness to light.

Dyestuffs of similar dyeing properties and colors are obtained, if hexahydroaniline is replaced by the equimolecular amount of hexahydro-para-toluidine or hexahydro-ortho-toluidine or hexahydro-para-anisidine, or if the anthraquinone derivative used is replaced by the 1-amino-8-acetylamino-4-bromoanthraquinone-2-sulfonic acid.

Example 3

5 parts of the sodium salt of 1-amino-5-acetylamino-4-bromoanthraquinone-2-sulfonic acid are heated to boiling with 20 parts of aniline, 5 parts of sodium carbonate and 0.3 part of copper sulfate in 100 parts of water. The solution is kept boiling for about 1½ hours while stirring. Upon cooling, the dyestuff separates in form of crystalline needles, which are soluble in water to form blue solutions and which dye wool from an acid bath greenish-blue shades.

A dyestuff of similar properties is obtained, if the above mentioned anthraquinone derivative is replaced by the corresponding 8-acetylamino compound.

Example 4

5 parts of the sodium salt of 1-amino-5-acetylamino-4-bromoanthraquinone-2-sulfonic acid are heated to boiling for about 1½ hours while stirring in a solution of 20 parts of toluidine, 5 parts of sodium carbonate and 0.3 part of copper sulfate in 100 parts of water. Upon cooling, the dyestuff separates, which dyes wool from an acid bath somewhat more greenish shades than the dyestuff obtained according to Example 3.

Dyestuffs of similar greenish tints are obtained, if toluidine is replaced by the equimolecular amount of para-chloro-aniline or para-anisidine.

Example 5

5 parts of the sodium salt of 1-amino-5-acetylamino-4-bromoanthraquinone-2-sulfonic acid are heated to 60° C. in a solution of 10 parts of para-amino-acetanilide, 5 parts of sodium carbonate and 0.3 part of cuprous chloride in 75 parts of water, until a test portion no longer shows unaltered starting material under the microscope. The new dyestuff is easily soluble in water to form greenish-blue solutions and dyes wool from an acid bath vivid greenish-blue shades.

A dyestuff of similar properties is obtained from the corresponding 8-acetylamino compound.

Example 6

5 parts of the sodium salt of 1-amino-5-benzoylamino-4-bromoanthraquinone-2-sulfonic acid is heated to 60–80° C. in a mixture of 10 parts of para-amino-acetanilide, 5 parts of sodium carbonate and 0.5 part of cuprous bromide and 100 parts of water, until a clear greenish-blue solution is obtained. Upon filtration, the solution is carefully acidified by means of hydrochloric acid, whereby the new condensation product is precipitated. By redissolving the product from aqueous pyridine, the new dyestuff is obtained in a crystalline form. It is soluble in water to form greenish-blue solutions and dyes wool from an acid bath greenish-blue shades.

Example 7

10 parts of 1-amino-8-acetylamino-4-bromoanthraquinone-2-sulfonic acid in form of its sodium salt are dissolved in 300 parts of hot water. Upon cooling down the solution to 60° C. there are added 10 parts of sodium carbonate, 10 parts of 1,4-dimethoxy-2-amino-5-acetylaminobenzene and 0.5 part of cuprous chloride. The temperature is then raised to 70–80° C.

The new condensation product separates in the course of the reaction in a crystalline form. As soon as the test portion no longer shows unaltered starting material, the precipitate is filtered off and recrystallized from water. The new dyestuff is soluble in water to form green solutions and dyes wool from an acid bath vivid green shades.

Similar properties are possessed by the isomeric condensation products from the corresponding 5-acetylamino compound.

Example 8

6 parts of the sodium salt of 1-amino-5-acetylamino-4-bromoanthraquinone-2-sulfonic acid, 6 parts of monoacetyl-benzidine and 0.3 part of cuprous chloride are heated to boiling in 100 parts of water and 50 parts of ethylalcohol. Upon cooling the new condensation product separates in form of crystals. It is soluble in water to form blue greenish solutions and dyes cotton from an sodium sulfate bath bluish-green shades.

We claim:—

1. The process which comprises heating a compound having in its free state the formula:—

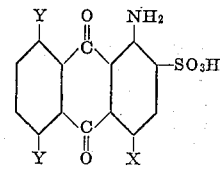

wherein X stands for chlorine or bromine and one Y stands for an acylamino group, the other Y indicating hydrogen, with an amine, which contains at least one hydrogen atom attached to the nitrogen of the amine.

2. The process which comprises heating a compound having in its free state the formula:—

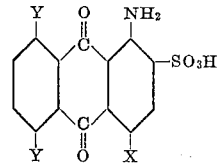

wherein X stands for chlorine or bromine and one Y stands for an acetylamino group, the other Y indicating hydrogen, with an amine, which contains at least one hydrogen atom attached to the nitrogen of the amine.

3. The process which comprises heating a compound having in its free state the formula:—

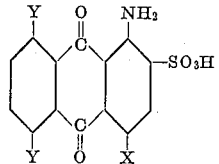

wherein X stands for chlorine or bromine and one Y stands for an alkoxy-acetylamino group, the other Y indicating hydrogen, with an amine, which contains at least one hydrogen atom attached to the nitrogen of the amine.

4. The process which comprises heating a compound having in its free state the formula:—

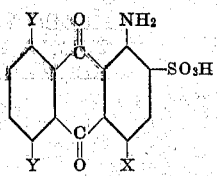

wherein X stands for chlorine or bromine and one Y stands for the methoxy-acetylamino group, the other Y indicating hydrogen, with an amine, which contains at least one hydrogen atom attached to the nitrogen of the amine.

5. The process which comprises heating a compound having in its free state the formula:—

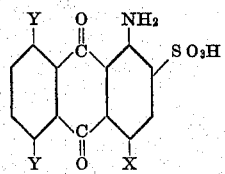

wherein X stands for chlorine or bromine and one Y stands for an acylamino group, the other Y indicating hydrogen, with hexahydroaniline.

6. The process which comprises heating a compound having in its free state the formula:—

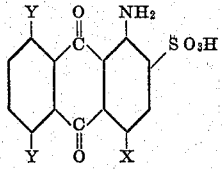

wherein X stands for chlorine or bromine and one Y stands for an acetylamino group, the other Y indicating hydrogen, with hexahydroaniline.

7. The process which comprises heating a compound having in its free state the formula:—

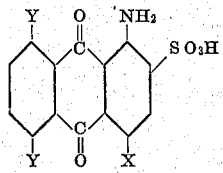

wherein X stands for chlorine or bromine and one Y stands for the methoxyacetylamino group, the other Y indicating hydrogen, with hexahydroaniline.

8. The process which comprises heating a compound having in its free state the formula:—

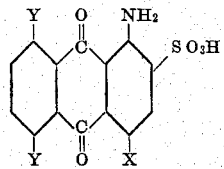

wherein X stands for chlorine or bromine and one Y stands for the acetylamino group, the other Y indicating hydrogen, with para-aminoacetanilide.

9. The compounds having in their free form the formula:—

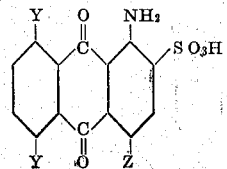

wherein Z stands for an amino group, which may contain aliphatic, hydroaromatic or aromatic radicals and one Y stands for an acylamino group, the other Y indicating hydrogen, said compounds being in form of their alkali metal salts blue to bluish-green crystals, dissolving in water with the same coloration, dyeing wool from an acid bath blue to bluish-green shades of excellent fastness properties.

10. The compounds having in their free form the formula:—

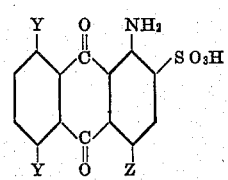

wherein Z stands for an amino group, which may contain aliphatic, hydroaromatic or aromatic radicals, and one Y stands for an acetylamino group, the other Y indicating hydrogen, said compounds being in form of their alkali metal salts blue to bluish-green crystals, dissolving in water with the same coloration, dyeing wool from an acid bath blue to bluish-green shades of excellent fastness properties.

11. The compounds having in their free form the formula:—

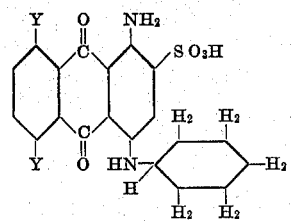

wherein one Y stands for an acetylamino group, the other Y indicating hydrogen, said compounds being in form of their alkali metal salts blue to bluish-green crystals, dissolving in water with the same coloration, dyeing wool from an acid bath blue to bluish-green shades of excellent fastness properties.

12. The products having in their free form the formula:—

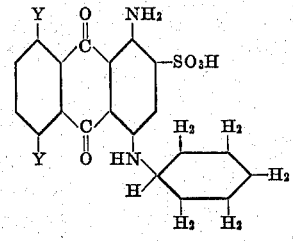

wherein one Y stands for the methoxy-acetylamino group, the other Y indicating hydrogen, said products being in form of their alkali metal salts blue crystals, dissolving in water with the same coloration, dyeing wool from an acid bath blue shades of excellent fastness properties.

13. The products having in their free form the formula:—

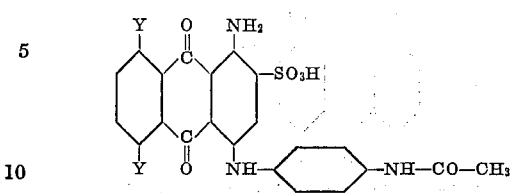

wherein one Y stands for the acetylamino group, the other Y indicating hydrogen, said products being in form of their alkali metal salts greenish-blue crystals, dissolving in water with the same coloration, dyeing wool from an acid bath greenish-blue shades of excellent fastness properties.

KLAUS WEINAND.
CURT BAMBERGER.
HERMANN UTSCH.